(12) United States Patent
Nishita (10) Patent No.: US 12,000,701 B2
(45) Date of Patent: Jun. 4, 2024

(54) SURVEYING INSTRUMENT, POLE HAVING A REFLECTIVE PERIPHERAL SURFACE AND SURVEYING SYSTEM HAVING TRIGGER DEVICE FOR IRRADIATING A LASER POINT ALONG AN AXIS OF THE POLE

(71) Applicant: TOPCON Corporation, Tokyo-to (JP)

(72) Inventor: Nobuyuki Nishita, Tokyo-to (JP)

(73) Assignee: TOPCON CORPORATION, Tokyo-to (JP)

( * ) Notice: Subject to any disclaimer, the term of this patent is extended or adjusted under 35 U.S.C. 154(b) by 959 days.

(21) Appl. No.: 16/935,359

(22) Filed: Jul. 22, 2020

(65) Prior Publication Data

US 2021/0025707 A1 Jan. 28, 2021

(30) Foreign Application Priority Data

Jul. 26, 2019 (JP) ................................. 2019-137622

(51) Int. Cl.
*G01C 15/00* (2006.01)
*G01C 11/14* (2006.01)
(Continued)

(52) U.S. Cl.
CPC ............ *G01C 15/002* (2013.01); *G01C 11/14* (2013.01); *G01C 15/02* (2013.01); *G01C 15/06* (2013.01)

(58) Field of Classification Search
CPC ...... G01C 15/02; G01C 11/14; G01C 15/002; G01C 1/00; G01C 3/00; G01C 9/06;
(Continued)

(56) References Cited

U.S. PATENT DOCUMENTS 5,512,905 A * 4/1996 Nichols ................. G01C 15/06
342/357.29
5,760,909 A * 6/1998 Nichols ................. G01S 19/35
356/141.3
(Continued)

FOREIGN PATENT DOCUMENTS

JP 5091234 B2 12/2012
JP 2016-145791 A 8/2016
(Continued)

*Primary Examiner* — Michael P LaPage
(74) *Attorney, Agent, or Firm* — NIELDS, LEMACK & FRAME, LLC (57) ABSTRACT

A surveying system includes a distance measuring unit for performing the distance measurement based on the distance measuring light, an optical axis deflector configured to enable two-dimensionally deflecting the optical axis of the distance measuring light, a projecting direction detecting module for performing the angle measurement of the optical axis of the distance measuring light, and an arithmetic control module performs captures the pole by a scan pattern having a predetermined shape, acquires the point cloud data of at least two positions where the scan pattern crosses the pole, calculates an axis of the pole, calculates a direction vector, performs a linear scan along the direction vector, determines as a measuring point a point where an intersection of the optical axis of the distance measuring light and the direction vector coincides or substantially coincides with a measurement result, and calculates the three-dimensional coordinates of the measuring point.

18 Claims, 10 Drawing Sheets

(51) Int. Cl.
*G01C 15/02* (2006.01)
*G01C 15/06* (2006.01)

(58) Field of Classification Search
CPC .......... G01C 11/04; G01C 3/08; G01C 15/08; G01C 15/06; G01S 7/481; G01S 7/48; G01S 17/42; G01S 7/4808; G01S 7/4817; G01S 17/66; G01S 17/89; G01S 17/46; G06T 7/70; G06T 7/74; G06T 2207/10028; G06T 2207/30204
USPC ........................................ 356/622, 601, 614
See application file for complete search history.

(56) References Cited

U.S. PATENT DOCUMENTS

| | | | | |
|---|---|---|---|---|
| 7,215,412 | B2* | 5/2007 | O'Loughlin | G01C 3/08 |
| | | | | 356/4.02 |
| 8,826,552 | B2* | 9/2014 | Nishita | G01C 15/004 |
| | | | | 33/290 |
| 9,091,540 | B2* | 7/2015 | Laabs | G01C 15/00 |
| 2005/0057745 | A1* | 3/2005 | Bontje | G01C 15/002 |
| | | | | 356/139.03 |
| 2009/0171618 | A1* | 7/2009 | Kumagai | G01S 17/66 |
| | | | | 702/152 |
| 2014/0081571 | A1* | 3/2014 | Briggs | G01C 15/00 |
| | | | | 701/523 |
| 2016/0216110 | A1 | 7/2016 | Nishita et al. | |
| 2016/0259039 | A1 | 9/2016 | Ohtomo et al. | |
| 2017/0061605 | A1* | 3/2017 | Nagashima | G06T 7/70 |
| 2017/0168142 | A1 | 6/2017 | Kumagai et al. | |
| 2018/0329041 | A1 | 11/2018 | Ohtomo et al. | |
| 2019/0063922 | A1 | 2/2019 | Ohtomo et al. | |
| 2022/0283327 | A1* | 9/2022 | Mueller | G01C 11/06 |

FOREIGN PATENT DOCUMENTS

| | | |
|---|---|---|
| JP | 2016-161411 A | 9/2016 |
| JP | 2017-106813 A | 6/2017 |
| JP | 2018-189576 A | 11/2018 |
| JP | 2019-39795 A | 3/2019 |

\* cited by examiner

SURVEYING INSTRUMENT, POLE HAVING A REFLECTIVE PERIPHERAL SURFACE AND SURVEYING SYSTEM HAVING TRIGGER DEVICE FOR IRRADIATING A LASER POINT ALONG AN AXIS OF THE POLE

BACKGROUND OF THE INVENTION

The present invention relates to a surveying system which can measure an object as desired.

Generally, to perform a survey, an object which is to be measured, for instance, a retroreflective prism (a corner cube) is installed on a measuring point. Further, the corner cube is sighted from a surveying instrument such as a total station installed on a known point. Thereby, a distance to the corner cube and a horizontal angle and a vertical angle of a sighting direction with respect to a known direction are measured, and a horizontal distance to the corner cube, the horizontal angle, and a vertical height of the corner cube are acquired.

In the conventional examples, the object is sighted by a camera provided in the surveying instrument, a measuring point as desired is designated via an image of the camera, and a survey is performed.

However, in a case where a worker is present at a position distanced from the surveying instrument, for instance, in a case where the surveying instrument is remotely operated by a remote operation device such as a tablet, a viewing point of the worker is different from a viewing point of the camera. For this reason, smoothly designating the measuring point has been difficult.

SUMMARY OF INVENTION

It is an object of the present invention to provide a surveying system which can easily designate a measuring point while visually confirming an object to be measured.

To attain the object as desired, a surveying system according to the present invention includes a surveying instrument and a trigger device, wherein the trigger device includes a pole configured to have a high reflectance on a peripheral surface, the surveying instrument includes a distance measuring unit for projecting the distance measuring light, receiving the reflected distance measuring light and performing the distance measurement, an optical axis deflector which is provided on an optical axis of the distance measuring light and configured to enable two-dimensionally deflecting the distance measuring light and the optical axis, a projecting direction detecting module for detecting a deflection angle of the optical axis of the distance measuring light and performing the angle measurement, and an arithmetic control module for controlling the distance measuring unit and the optical axis deflector, wherein the arithmetic control module performs a search scan using the distance measuring light in a scan pattern having a predetermined shape, captures the pole, acquires the point cloud data of at least two positions where the scan pattern crosses the pole, calculates an axis of the pole based on the point cloud data, calculates a direction vector based on the axis of the pole, performs a linear scan using the distance measuring light along the direction vector, determines as a measuring point a point where an intersection of the optical axis of the distance measuring light and the direction vector acquired by the calculation coincides or substantially coincides with a measurement result acquired by a distance measurement result and an angle measurement result, and calculates the three-dimensional coordinates of the measuring point Further, in the surveying system according to a preferred embodiment, the trigger device includes a trigger communication module configured to communicate with the surveying instrument and a trigger switch configured to transmit a measurement start signal with respect to the surveying instrument.

Further, in the surveying system according to a preferred embodiment, the trigger device further includes at least one laser pointer, and the laser pointer is arranged in such a manner that one laser pointer light is projected onto the axis or a plurality of laser pointer lights are projected to the positions which are parallel to and away from the axis at an equal distance.

Further, in the surveying system according to a preferred embodiment, the pole is constituted of a narrow-diameter portion and a thick-diameter portion having the different diameters, and the arithmetic control module configured to calculate a direction of the direction vector based on the point cloud data and determines a direction of the linear scan.

Further, in the surveying system according to a preferred embodiment, the trigger device further includes a target provided on a boundary portion between the narrow-diameter portion and the thick-diameter portion of the pole, and the target has a diameter larger than the diameters of the narrow-diameter portion and the thick-diameter portion, a center of the target placed on the axis and existed at a known distance from a tip, and a peripheral surface having a high reflectance.

Further, in the surveying system according to a preferred embodiment, the arithmetic control module configured to capture again the pole in the scan pattern after calculating the three-dimensional coordinates of the measuring point.

Further, in the surveying system according to a preferred embodiment, the arithmetic control module configured to increase the point cloud density between two points at each of which a distance between the intersection and the measurement result becomes a preset threshold value or less, and perform again the linear scan.

Further, in the surveying system according to a preferred embodiment, the linear scan is configured to perform an arbitrary point on the direction vector as a start point.

Further, in the surveying system according to a preferred embodiment, the arithmetic control module configured to control the optical axis deflector in such a manner that a center of the scan pattern substantially coincides with the center of the target.

Further, in the surveying system according to a preferred embodiment, the linear scan is configured to perform the tip of the pole on the direction vector as a start point.

Further, in the surveying system according to a preferred embodiment, the arithmetic control module configured to scan a whole predetermined range having the measuring point as a center with the use of the distance measuring light after calculating the three-dimensional coordinates of the measuring point.

Furthermore, in the surveying system according to a preferred embodiment, the scan pattern is a scan pattern which draws a locus with a shape of numeral 8.

According to the present invention, a surveying system includes a surveying instrument and a trigger device, wherein the trigger device includes a pole configured to have a high reflectance on a peripheral surface, the surveying instrument includes a distance measuring unit for projecting the distance measuring light, receiving the reflected distance measuring light and performing the distance measurement, an optical axis deflector which is provided on an optical axis of the distance measuring light and configured to enable two-dimensionally deflecting the distance measuring light and the optical axis, a projecting direction detecting module for detecting a deflection angle of the optical axis of the distance measuring light and performing the angle measurement, and an arithmetic control module for controlling the distance measuring unit and the optical axis deflector, wherein the arithmetic control module performs a search scan using the distance measuring light in a scan pattern having a predetermined shape, captures the pole, acquires the point cloud data of at least two positions where the scan pattern crosses the pole, calculates an axis of the pole based on the point cloud data, calculates a direction vector based on the axis of the pole, performs a linear scan using the distance measuring light along the direction vector, determines as a measuring point a point where an intersection of the optical axis of the distance measuring light and the direction vector acquired by the calculation coincides or substantially coincides with a measurement result acquired by a distance measurement result and an angle measurement result, and calculates the three-dimensional coordinates of the measuring point. As a result even if a worker is present at a position away from the measuring instrument, the measuring point can be directly visually confirmed from the vicinity and designated, and the workability can be improved.

DETAILED DESCRIPTION OF THE PREFERRED EMBODIMENTS

A description will be given on an embodiment of the present invention by referring to the attached drawings.

Figure 1:
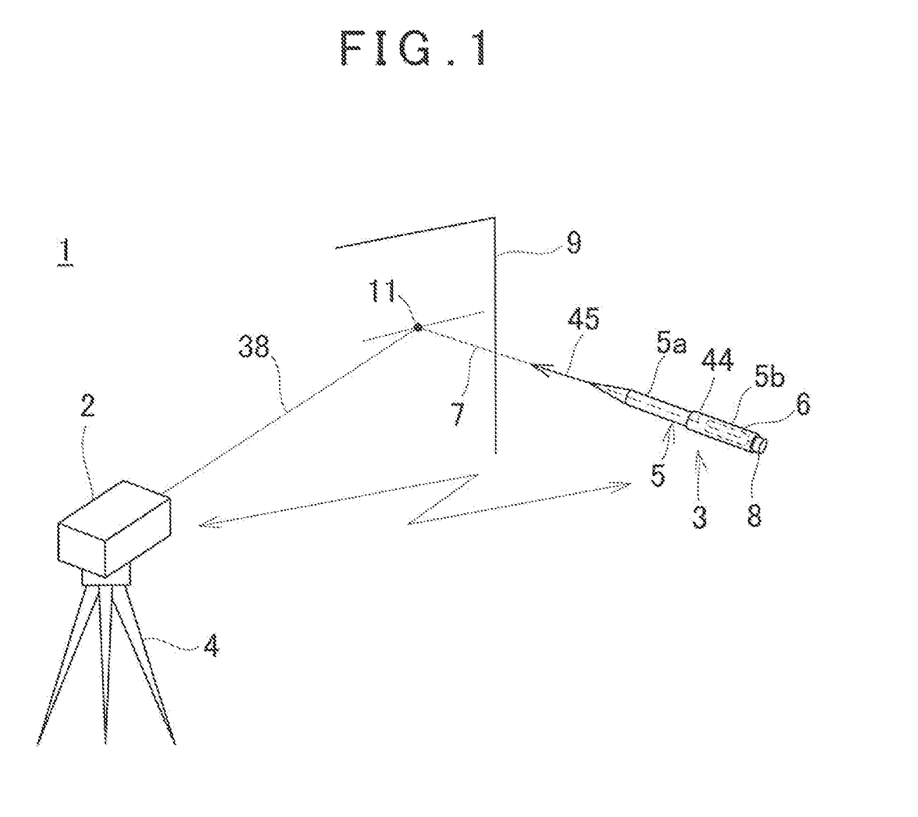
FIG. 1 is a schematical drawing of a surveying system according to a first embodiment of the present invention.

First, in FIG. 1, a description will be given on an outline of a surveying system according to a first embodiment of the present invention.

A surveying system 1 has a surveying instrument 2 provided at an arbitrary position and a trigger device 3 having a trigger communication module 6 which can communicate with the surveying instrument 2. The surveying instrument 2 is, for instance, a laser scanner, and the surveying instrument 2 is provided on a tripod 4. The trigger communication module 6 may be externally provided to a later-described pole 5 or may be provided inside the pole 5.

The trigger device 3 has a cylindrical pole 5. The pole 5 is configured to have the diameters which are different on one side and the other side. In the present embodiment, the one side is a narrow-diameter portion 5a having a smaller diameter and the other side is a thick-diameter portion 5b which is concentric with the narrow-diameter portion 5a and has a larger diameter, Further, the narrow-diameter portion 5a side is determined as a tip side. A reflective sheet having the retroreflective properties is provided on a peripheral surface of each of the narrow-diameter portion 5a and the thick-diameter portion 5b, and the pole 5 has a high reflectance. It is to be noted that, in place of the reflective sheet, a reflective paint having the microprisms mixed therein may be applied.

Further, an end portion of the narrow-diameter portion 5a has a conical shape which diameter is reduced toward the tip side, and the tip is a sharp edge. Further, a laser pointer (not shown) is provided on the narrow-diameter portion 5a. The laser pointer can be lighted on and off. When the laser point is lighted on, the laser pointer light 7 is projected from the tip of the narrow-diameter portion 5a. An optical axis of the laser pointer light 7 coincides with an axis of the pole 5, and the laser pointer light 7 can irradiate a measuring point 11.

At an end portion of the thick-diameter portion 5b, a trigger switch 8 as a trigger operation module is provided. When the trigger switch 8 is pressed, a measurement start signal is transmitted to the surveying instrument 2, and the laser pointer light 7 irradiates the measuring point 11 of an object which is to be measured 9. The surveying instrument 2 sights the pole 5 based on the measurement start signal, and makes a three-dimensional survey of the measuring point 11 with reference to the surveying instrument 2.

Figure 2:
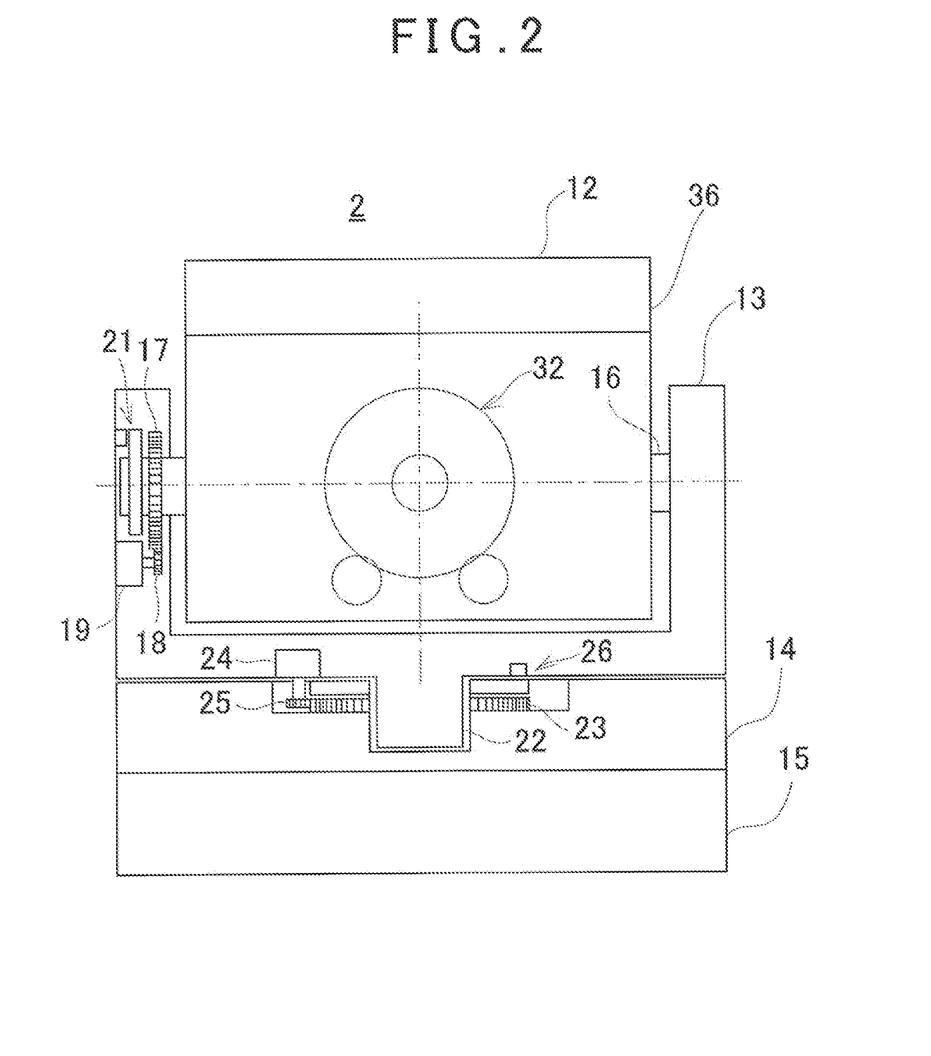
FIG. 2 is a front view showing a surveying instrument according to the first embodiment of the present invention.
Figure 3:
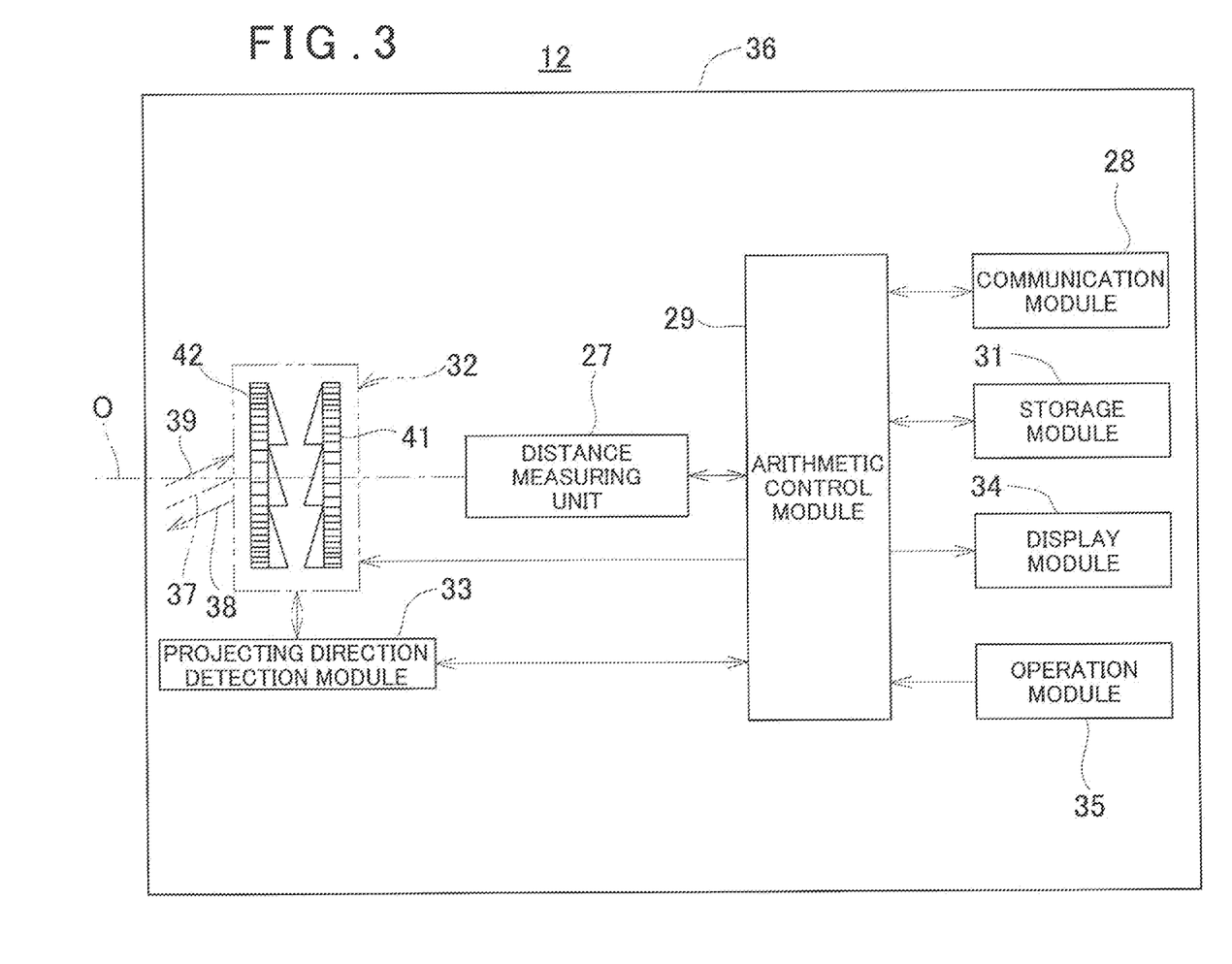
FIG. 3 is a schematical block diagram of the surveying instrument in the surveying system.

Next, a description will be given on the particulars of the surveying instrument 2 by referring to FIG. 2 and FIG. 3. The surveying instrument 2 has a surveying instrument main body 12, a frame unit 13, a base unit 14, and a surveying base 15.

The surveying instrument main body 12 is supported by the frame unit 13 via a longitudinal rotation shaft 16, and can integrally rotate with the longitudinal rotation shaft 16 around the longitudinal rotation shaft 16 in the longitudinal direction.

A longitudinal driven gear 17 is fitted on an end portion of the longitudinal rotation shaft 16. The longitudinal driven gear 17 meshes with a longitudinal driving gear 18, and the longitudinal driving gear 18 is fixed to an output shaft of a longitudinal driving motor 19. The surveying instrument main body 12 is longitudinally rotated by the longitudinal driving motor 19.

Further, a longitudinal rotation angle detector 21 (for instance, an encoder) which detects a longitudinal rotation angle (an angle in a rotating direction around the longitudinal rotation shaft 16) is provided between the longitudinal rotation shaft 16 and the frame unit 13. A relative rotation angle of the surveying instrument main body 12 to the frame unit 13 in the longitudinal direction is detected by the longitudinal rotation angle detector 21.

A lateral rotation shaft 22 is protruded from a lower surface of the frame unit 13. The lateral rotation shaft 22 is rotatably fitted in the base unit 14 via a bearing (not shown). The frame unit 13 can rotate around the lateral rotation shaft 22 in the lateral direction.

A lateral driven gear 23 is fixed to the base unit 14 concentrically with the lateral rotation shaft 22. A lateral driving motor 24 is provided to the frame unit 13, and a lateral driving gear 25 is fixed to an output shaft of the lateral driving motor 24. The lateral driving gear 25 meshes with the lateral driven gear 23. The frame unit 13 is rotated in the lateral direction integrally with the lateral rotation shaft 22 by the lateral driving motor 24.

Further, a lateral rotation angle detector 26 (for instance, an encoder) which detects a lateral rotation angle (an angle in a rotating direction around the lateral rotation shaft 22) is provided between the lateral rotation shaft 22 and the base unit 14. A relative rotation angle of the frame unit 13 with respect to the base unit 14 in the lateral direction is detected by the lateral rotation angle detector 26. The longitudinal rotation angle detector 21 and the lateral rotation angle detector 26 constitute an angle detector which detects the rotation angles of the surveying instrument main body 12 in the longitudinal direction and the lateral direction.

Further, the base unit 14 is provided on the surveying base 15, and the surveying base 15 is installed on the tripod 4. It is to be noted that a leveling function may be imparted to the surveying base 15 so that the surveying base 15 can function as a leveling module which levels up the surveying instrument main body 12.

The surveying instrument main body 12 can be directed to a desired direction by the cooperation of the longitudinal driving motor 19 and the lateral driving motor 24. It is to be noted that a support unit of the surveying instrument main body 12 is constituted by the frame unit 13 and the base unit 14. Further, the longitudinal driving motor 19 and the lateral driving motor 24 constitute a rotation driving module of the surveying instrument main body 12.

It is to be noted that, in a case where a measurement range provided by the surveying instrument 2 is within a range of a deflection angle provided by an optical axis deflector 32 (to be described later) or in a case where the initial setting of a direction of a reference optical axis "O" (to be described later) of the optical axis deflector 32 is manually performed, the longitudinal driving motor 19, the longitudinal rotation angle detector 21, the lateral driving motor 24, and the lateral rotation angle detector 26, and the like can be omitted.

The surveying instrument main body 12 includes a distance measuring unit 27, a communication module 28, an arithmetic control module 29, a storage module 31, the optical axis deflector 32, a projecting direction detecting module 33, a display module 34, and an operation module 35. They are accommodated and integrated in a casing 36.

The distance measuring unit 27 and the optical axis deflector 32 are disposed on the reference optical axis "O". The distance measuring unit 27 has a distance measuring optical axis 37 transmitting through the center of the optical axis deflector 32. The distance measuring unit 27 emits a laser beam as the distance measuring light 38 onto the distance measuring optical axis 37, receives the reflected distance measuring light 39 from the distance measuring optical axis 37, and performs the distance measurement of the object 9 based on a round-trip time and a light velocity of the reflected distance measuring light 39. It is to be noted that the distance measuring unit 27 functions as an electronic distance meter. Further, the distance measurement data acquired by the distance measuring unit 27 is stored in the storage module 31.

As the laser beam, any one of the continuous light, the pulsed light or the intermittent modulated distance measuring light (the burst light) disclosed in Japanese Patent Application Publication No. 2016-161411 may be used. It is to be noted that the pulsed light and the burst light are generically referred to as the pulsed light.

The communication module 28 is a communication module provided on the surveying instrument side, and can communicate with the trigger communication module 6 via various types of communication means such as a wired or wireless. By pressing the trigger switch 8, the communication module 28 receives a measurement start instruction from the trigger device 3.

The arithmetic control module 29 expands and executes the various types of programs in correspondence with an operation state of the surveying instrument main body 12. Thereby, the arithmetic control module 29 performs the control of the distance measuring unit 27, the control of the optical axis deflector 32 and the like, and carries out the measurement. It is to be noted that, as the arithmetic control module 29, a CPU specialized for this instrument or a general-purpose CPU is used.

In the storage module 31, various types of programs are stored. These programs include: a display program, a measurement program for performing the distance measurement, a deflection control program for controlling a deflecting operation of the optical axis deflector 32, a direction calculation program for calculating a direction vector of the pole 5 based on a measurement result of the pole 5, an intersection detection program for detecting an intersection of the laser pointer light 7 and the measuring point 11, a communication program for communicating with the trigger device 3, a calculation program for executing the various types of calculations and other programs. Further, in the storage module 31, the various types of data such as the distance measurement data and the angle measurement data are stored.

Further, as the storage module 31, various types of storage devices are used. These storage devices include: a HDD as a magnetic storage device, a internal memory, a memory card and a USB memory as a semiconductor storage device and other storage devices are used. The storage module 31 may be attachable or detachable the casing 36. Alternatively, the storage module 31 may enable transmitting the data to an external storage device or an external data processing device via a desired communicating means.

The optical axis deflector 32 deflects the distance measuring optical axis 37 in the range of, for instance, ±20°, and sights the distance measuring light 38 on the pole 5 or the measuring point 11. In a state where the optical axis deflector 32 does not deflect the distance measuring optical axis 37, the distance measuring optical axis 37 coincides with the reference optical axis "O". It is to be noted that, as the optical axis deflector 32, an optical axis deflector disclosed in Japanese Patent Application Publication No. 2018-189576, Japanese Patent Application Publication No. 2017-106813 or the like can be used.

The optical axis deflector 32 will be further described. The optical axis deflector 32 includes a pair of optical prisms 41 and 42. The optical prisms 41 and 42 have disk shape with the same diameter, respectively, are arranged concentrically on the distance measuring optical axis 37 while crossing the distance measuring optical axis 37 at a right angle, and are arranged in parallel at a predetermined interval. By controlling the individual rotations of the optical prisms 41 and 42, the distance measuring optical axis 37 can be deflected at an arbitrary angle ranging from 0° to a maximum deflection angle with reference to the reference optical axis "O".

Further, when the optical prisms 41 and 42 are continuously driven and the distance measuring optical axis 37 is continuously deflected while continuously irradiating the distance measuring light 38. Thereby, the distance measuring light 38 can be scanned by a two-dimensional in a predetermined pattern with the reference optical axis "O" as a center.

For instance, in a state where a positional relationship between the optical prisms 41 and 42 is fixed, when the optical prisms 41 and 42 are integrally rotated, a locus drawn by the distance measuring light 38 becomes a circular scan pattern having the distance measuring optical axis 37 as a center. Further, when one optical prism in the optical prisms 41 and 42 is rotated in a forward direction at 17.5 Hz and the other optical prism is rotated at 5 Hz in a reverse direction, a flower petal-shaped two-dimensional closed loop scan pattern can be obtained. Further, when a rotation ratio of the optical prisms 41 and 42 is set to 1:2, the two-dimensional closed loop scan pattern with a shape of numeral 8 can be obtained.

The projecting direction detecting module 33 detects a relative rotation angle of the optical prisms 41 and 42 and an integrated rotation angle of the optical prisms 41 and 42, and detects a deflecting direction (a projecting direction) of the distance measuring optical axis 37 in real time.

The projecting direction detection result (an angle measurement result) is input to the arithmetic control module 29. The arithmetic control module 29 associates a distance measurement result and the projecting direction detection result with each other and stores the distance measurement result and the projecting direction detection result in the storage module 31.

In the display module 34, the measurement conditions, for instance, the point cloud density and the like, and the respective measurement conditions can be changed via the operation module 35. It is to be noted that the display module 34 may be formed as a touch panel so that the display module 34 can also serve as the operation module 35.

Next, a description will be given on an operation of the present embodiment with reference to a flowchart of FIG. 4 and FIG. 5A, FIG. 5B, FIG. 5C, and FIG. 5D. It is to be noted that the following operation is performed by the arithmetic control module 29 which executes the programs stored in the storage module 31.

Figure 4:
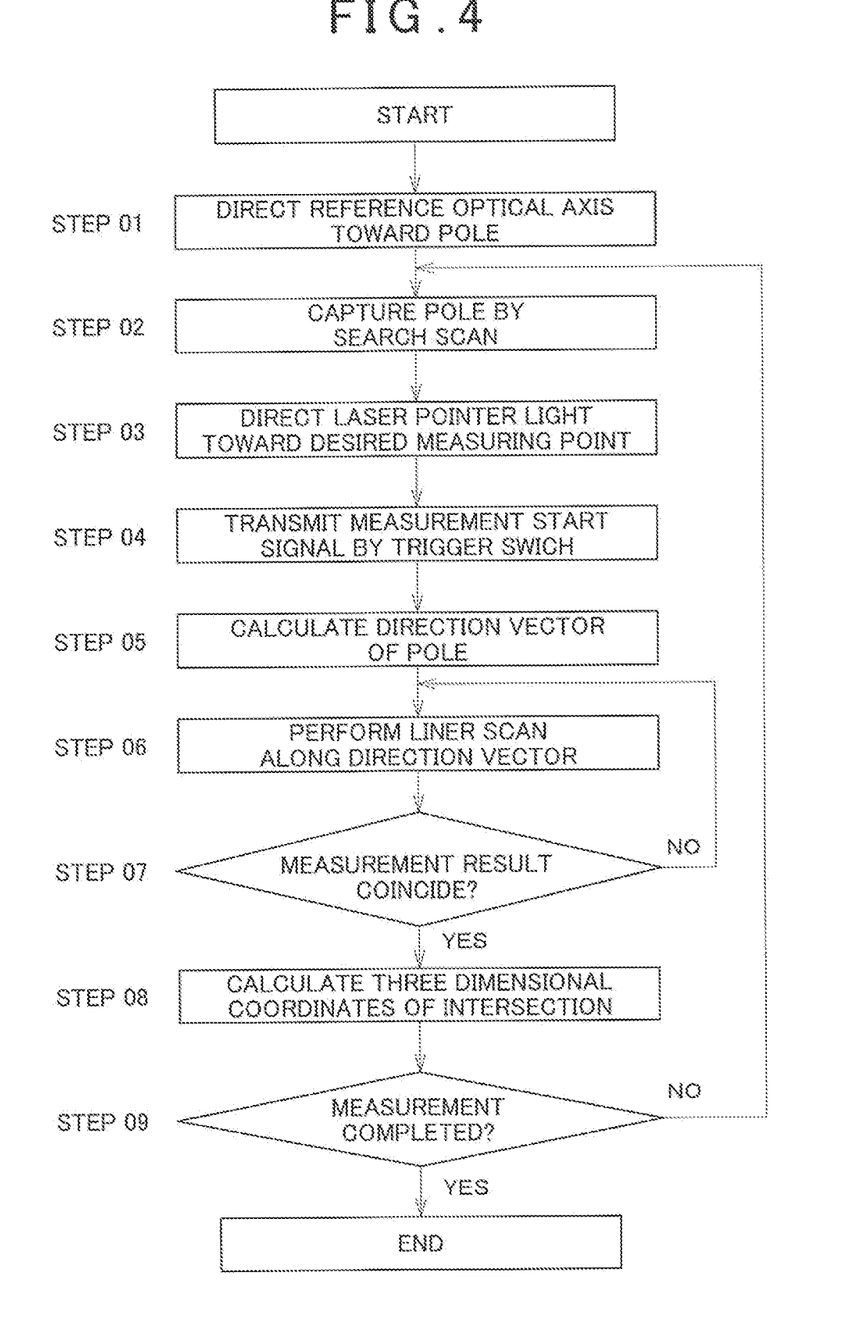
FIG. 4 is a flowchart showing an operation of the first embodiment of the present invention.

(Step 01) First, the surveying instrument main body 12 is automatically or manually directed toward the trigger device 3. Alternatively, a worker moves the trigger device 3 in accordance with a direction of the surveying instrument main body 12.

Figure 5A:
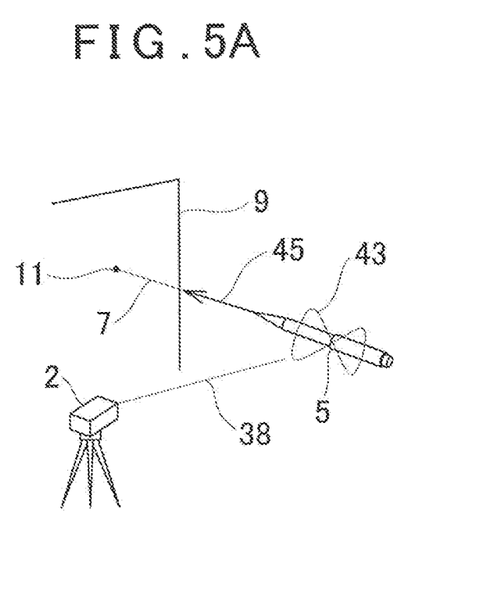
FIG. 5A, FIG. 5B, FIG. 5C and FIG. 5D are the explanatory drawings showing the operation of the first embodiment of the present invention.

(Step 02) The arithmetic control module 29 drives the distance measuring unit 27 and the optical axis deflector 32, and performs a search scan. As a scan pattern used at the time of performing the search scan, for instance, as shown in FIG. 5A, a closed loop scan pattern with the shape of numeral 8 to perform a scan using the distance measuring light 38 with a locus 43 with the shape of numeral 8 is selected. It is to be noted that, as the scan pattern, the various types of closed loop scan patterns such as a circular closed loop pattern may be selected.

In the search scan, the deflection angles of the optical prisms 41 and 42 are adjusted in such a manner that the locus 43 of the search scan can fall within a length of the pole 5 and the locus 43 passes through both the narrow-diameter portion 5a and the thick-diameter portion 5b.

(Step 03) In a state where the pole 5 is captured by the search scan, the laser pointer is lighted on, and the laser pointer light 7 is irradiated with respect to the desired measuring point 11 on the object 9.

(Step 04) In a state where the measuring point 11 has been irradiated with the laser pointer light 7, the worker presses the trigger switch 8. Thereby, a measurement start signal is transmitted via the trigger communication module 6, and the measurement start signal is received by the surveying instrument main body 12 via the communication module 28.

It is to be noted that, in the above description, in a state where the pole 5 has been captured by the search scan, the measuring point 11 is designated and the trigger switch 8 is pressed. On the other hand, the search scan may be started after designating the measuring point 11 and pressing the trigger switch 8.

(Step 05) The search scan causes the distance measuring optical axis 37 to pass through the narrow-diameter portion 5a and the thick-diameter portion 5b at least once in accordance with each scan period. Therefore, the narrow-diameter portion 5a crosses the locus 43, the thick-diameter portion 5b crosses the locus 43 and the point cloud data of the narrow-diameter portion 5a and the thick-diameter portion 5b is acquired.

When the measurement of the measuring point 11 is started based on the measurement start signal, the arithmetic control module 29 detects both the left and right side edges of the narrow-diameter portion 5a and the thick-diameter portion 5b based on the acquired point cloud data. Further, based on the three-dimensional coordinates of the detected edges and the radius of the pole 5a, the arithmetic control module 29 calculate an axis 44 (see FIG. 1) of the pole 5. It is to be noted that, the radius of the pole 5 is known. Therefore, a cylinder having the radius equivalent to the radius of the pole 5 (the narrow-diameter portion 5a, the thick-diameter portion 5b) is fitted with respect to the point cloud data, and an axis of the cylinder may be calculated as the axis 44. The axis 44 may be obtained by fitting the cylinder to any one of the narrow-diameter portion 5a and the thick-diameter portion 5b, or the axis 44 obtained by fitting the cylinder to each of the narrow-diameter portion 5a and the thick-diameter portion 5b may be averaged.

Further, based on the acquired point cloud data (a width between the detected edges), the arithmetic control module 29 determines which one is the narrow-diameter portion 5a (the tip side), that is, a direction of the pole 5. Further, based on the calculated axis 44 and the direction of the pole 5, the arithmetic control module 29 calculates a direction vector 45 of the pole 5 having a tilt and a direction.

Figure 5B:
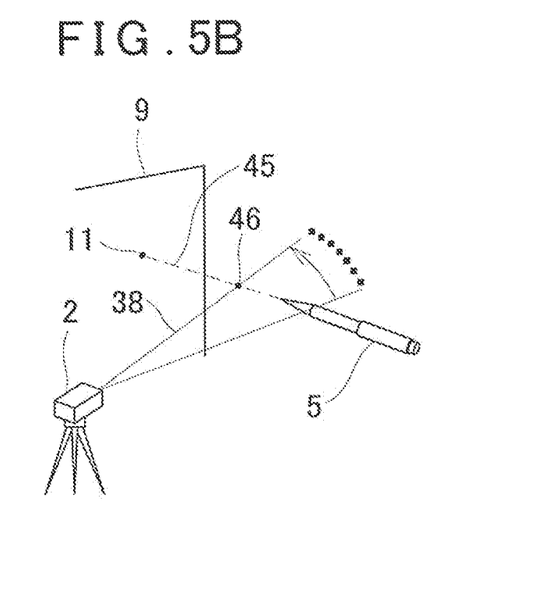
Figure 5C:
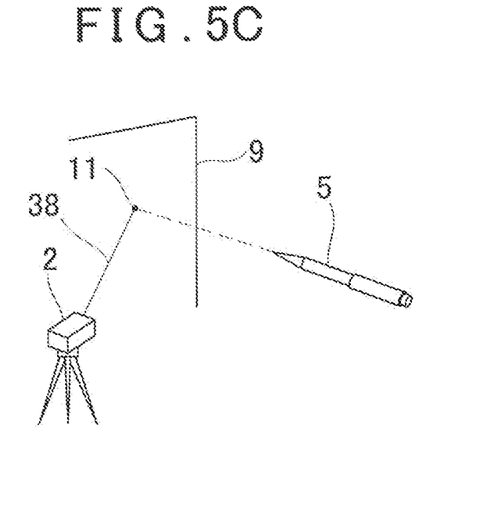

(Step 06) When the direction vector 45 has been calculated, the arithmetic control module 29 performs a linear scan (see FIG. 5B and FIG. 5C). In the linear scan, an arbitrary point on the axis 44 (the direction vector 45) is determined as a start point, and a scan is linearly performed using the distance measuring light 38 along the direction vector 45. In a case where the linear scan performs, since a direction of the tip of the pole 5 can be judged by the narrow-diameter portion 5a and the thick-diameter portion 5b, a direction of the linear scan can be also identified.

Here, the three-dimensional coordinates of the arbitrary point on the axis 44 as the start point and a deflection angle of the distance measuring optical axis 37 (an angle measurement result) in this time are known by the calculations. Therefore, the arithmetic control module 29 can calculate the three-dimensional coordinates of an intersection 46 of the direction vector 45 and the distance measuring optical axis 37 based on the three-dimensional coordinate of the start point, the tilt of the axis 44 and the deflection angle of the distance measuring optical axis 37 (a detection result of the projecting direction detecting module 33).

On the other hand, in the surveying instrument 2, except a case where the measuring point 11 irradiated with the laser pointer light 7 has been measured, a point which is not present on the direction vector 45 is measured.

(Step 07) The arithmetic control module 29 compares the three-dimensional coordinates of the intersection 46 acquired by the calculation with the three-dimensional coordinates (a measurement result) calculated based on a distance measurement result and an angle measurement result.

In a case where the calculation result of the intersection 46 does not coincide with the measurement result, a measurement result acquired by deflecting the distance measuring optical axis 37 along the direction vector 45 is again compared with the calculation result of the intersection 46.

(Step 08) As shown in FIG. 5C, in a case where the calculation result of the intersection 46 coincides with the measurement result, the arithmetic control module 29 determines the matched point to be the measuring point 11, and finishes the linear scan. Further, the measurement result of the matched point is displayed in the display module 34 as the measurement result of the measuring point 11, and stored in the storage module 31.

It is to be noted that there is no measurement result which coincides with the calculation result of the intersection 46 depending on the measurement conditions such as the point cloud density. That is, there is a case where the measuring point 11 is not measured by the surveying instrument 2.

Figure 5D:
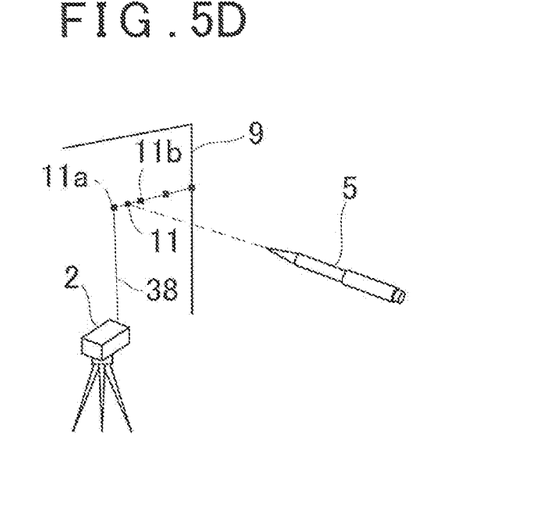

In this case, a point at which a distance to the calculated intersection 46 becomes minimum may be regarded as the measuring point 11. Alternatively, as shown in FIG. 5D, two points 11a and 11b at each of which the distance to the calculated intersection 46 becomes a preset threshold value or less are calculated, the point cloud density may be increased between the two points 11a and 11b, the linear scan may be again performed, and the calculation result of the intersection 46 may be compared with the measurement result.

(Step 09) Upon completing the measurement of the measuring point 11 by the surveying instrument 2, the arithmetic control module 29 drives the optical axis deflector 32, again performs the search scan with the start point as a center, and captures the pole 5. To continue the measurement, when the desired measuring point 11 is again irradiated with the laser pointer light 7 and the trigger switch 8 is pressed, the processing of (Step 05) to (Step 09) is again executed.

It is to be noted that, during the search scan, the optical axis deflector 32 may be automatically adjusted so that the scan pattern with a shape of numeral 8 can be carried out around an arbitrary point on the axis 44 of the pole 5 (the rough tracking).

As described above, in the first embodiment, the direction vector 45 of the pole 5 captured by the search scan of the surveying instrument 2 is calculated, the linear scan is performed using the distance measuring light 38 along the direction vector 45 and a point at which the intersection 46 coincides with the measurement result is determined as the measuring point 11 designated by the trigger device 3, and the measurement is performed.

Therefore, even if a worker is present at a position away from the surveying instrument 2, the worker can directly visually confirm the object 9 from the vicinity of the object 9 without confirming an image of the camera of the surveying instrument 2 and designate the measuring point 11 by the trigger device 3. Thereby, the measuring point 11 can be easily designated without getting bewildered by a difference in viewing point between a naked eye and a camera, and the workability can be improved.

Further, since the detection of the measuring point 11 can be finished when the measuring point 11 is detected after performing the linear scan along the direction vector 45, the point cloud data of the whole circumference does not have to be acquired. Therefore, the number of data to be acquired can be reduced, and a scan time can be decreased.

Further, the trigger device 3 only need the laser pointer and the trigger communication module 6 which transmits a measurement start signal in association with the pressing of the trigger switch 8. Therefore, since a distance meter or the like configured to measure a distance from the tip of the pole 5 to the measuring point 11 does not have to be provided to the trigger device 3, the instrument configuration can be simplified and a production cost can be reduced. Further, a measuring point at a distant position which the pole 5 cannot reach can be easily designated and measured.

It is to be noted that, in the first embodiment, the pole 5 is constituted of the narrow-diameter portion 5a and the thick-diameter portion 5b, and the tip side is determined based on a width between the edges when the point cloud data has been acquired by the arithmetic control module 29, but the determination on a direction of the pole 5 is not restricted thereto. For instance, the pole 5 may be formed into a conical shape or a triangular pyramid shape, and a direction of the pole 5 may be determined based on a difference in shape in the axial direction. Alternatively, two types of reflective sheets having the different reflectances may be provided on a peripheral surface of the pole 5, and a direction of the pole 5 may be determined based on a difference in light volume of the reflected distance measuring light 39.

Further, in case of performing the linear scan over the whole deflection range along the axis 44, the pole 5 may have the same diameter over the entire length.

Figure 6:
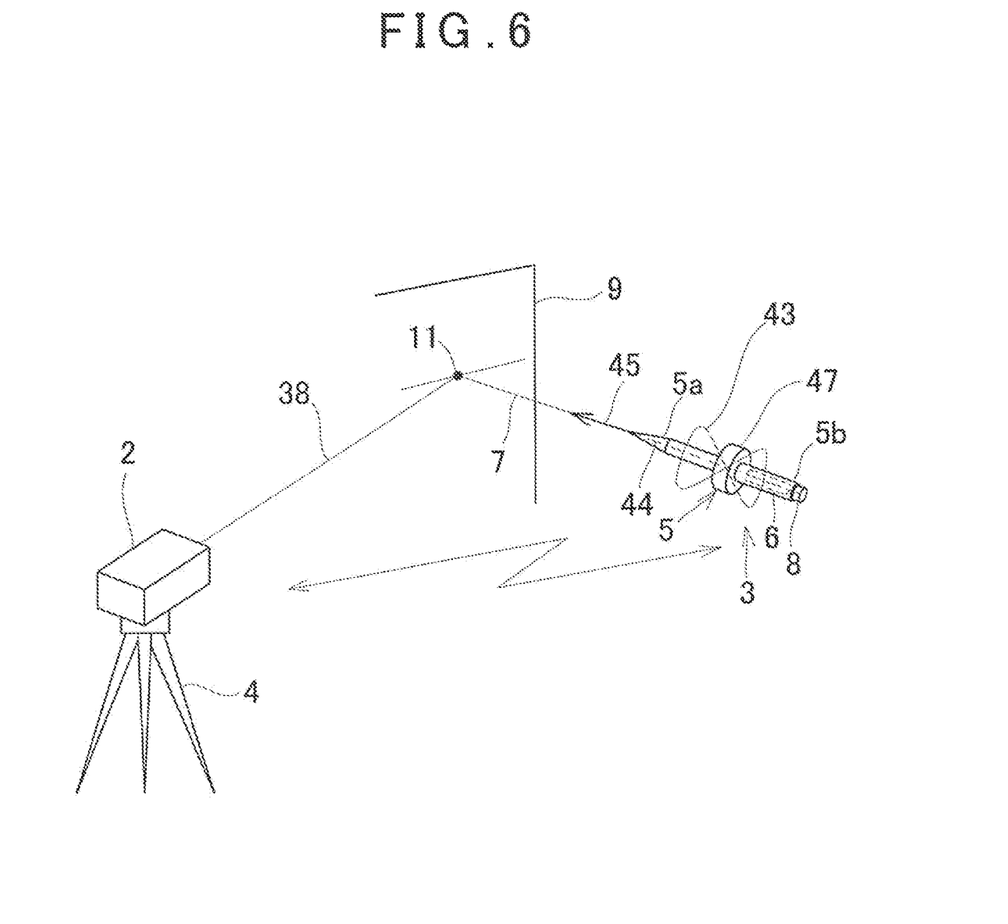
FIG. 6 is a schematical drawing of a surveying system according to a second embodiment of the present invention.

Next, a description will be given on a second embodiment of the present invention by referring to FIG. 6. It is to be noted that, in FIG. 6, the same components as shown in FIG. 1 are referred by the same symbols, and a description thereof will be omitted.

In case of the trigger device 3 according to the first embodiment, the movement of the pole 5 in a radial direction can be automatically tracked based on a measurement result of a search scan. On the other hand, the movement of the pole 5 in an axial direction cannot be tracked since a measurement result does not change. Therefore, in the second embodiment, a trigger device 3 has a target 47, the movement of the target 47 in the axial direction can be detected based on a measurement result of the target 47 and the trigger device 3 can be tracked in all directions.

The target 47 is a cylindrical member whose diameter is larger than the diameter of a pole 5, and the target 47 is provided at a boundary portion between a narrow-diameter portion 5a and a thick-diameter portion 5b of the pole 5. Further, a center of the target 47 is placed on an axis 44 of the pole 5, and a distance (a length) from a tip of the narrow-diameter portion 5a to the center of the target 47 is known. Further, a reflective sheet is provided on or a reflective paint is applied to a peripheral surface of the target 47, and the target 47 has a high reflectance over the whole circumference.

Figure 7:
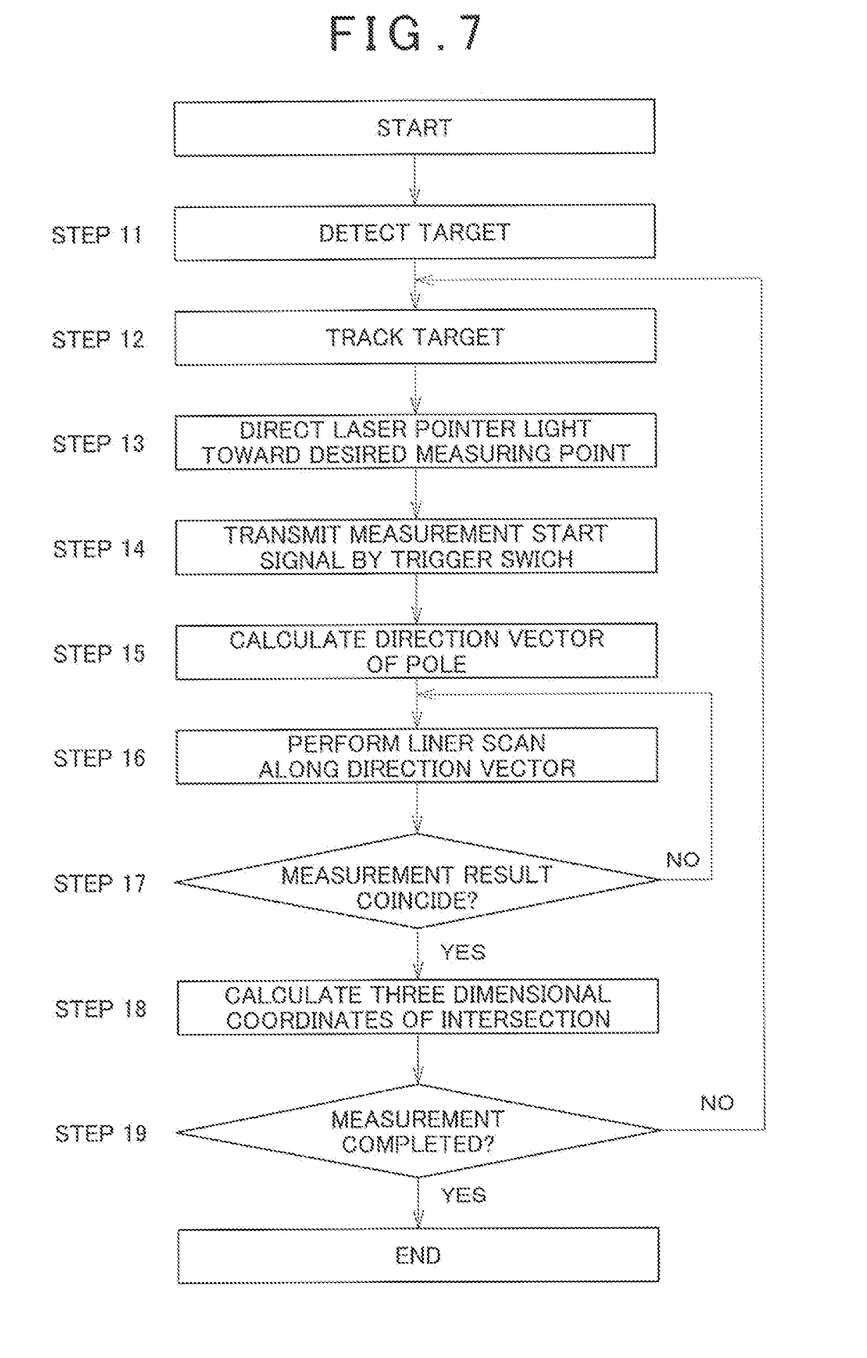
FIG. 7 is a flowchart showing an operation of the second embodiment of the present invention.

Next, a description will be given on an operation of the second embodiment with reference to a flowchart of FIG. 7. It is to be noted that the following operation is performed by an arithmetic control module 29 which executes the programs stored in a storage module 31.

(Step 11), (Step 12) In the second embodiment, the target 47 is first detected. In a state where the trigger device 3 is placed in a deflection range of an optical axis deflector 32 (see FIG. 3), a search scan is performed. As a scan pattern of the search scan, a scan pattern with a shape of numeral 8 is used like the first embodiment.

The arithmetic control module 29 (see FIG. 3) performs the search scan in the whole deflection range. When the pole 5 is detected by the search scan (when the pole 5 crosses a locus 43 of the scan pattern), the arithmetic control module 29 moves an intersection (a center) of the scan pattern toward the target 47 along the pole 5 until the target 47 is detected by the search scan.

It is to be noted that a direction of the pole 5 can be determined based on a measurement result of the narrow-diameter portion 5*a* and the thick-diameter portion 5*b*. Therefore, the intersection of the scan pattern can be moved toward the target 47 irrespective of the direction of the pole 5.

Since the target 47 is formed into a shape which is larger than the pole 5 in a radial direction, the target 47 can be detected based on a change in measurement result, and the intersection of the scan pattern can be arranged to coincide with the center of the target 47. It is to be noted that a difference between a radius of the pole 5 and a radius of the target 47 is set larger than a measurement accuracy of the surveying instrument 2. Therefore, the pole 5 and the target 47 can be identified based on a measurement result.

Further, when the above-described processing is continued and the optical axis deflector 32 is controlled in such a manner that the intersection of the scan pattern always coincides with the center of the target 47, the surveying instrument 2 can track the trigger device 3. It is to be noted that, as to the detail of the detection of the target 47 using the scan pattern with a shape of numeral 8 and the measurement and the tracking of the center of the target 47, a method disclosed in Japanese Patent Application Publication No. 2019-39795 can be used.

(Step 13) to (Step 15) When a measuring point 11 is irradiated with the laser pointer light 7 and a trigger switch 8 is pressed, the axis 44 of the pole 5 is calculated and a direction vector 45 of the pole 5 is calculated by the same method as that in the first embodiment.

(Step 16) to (Step 18) By calculating the direction vector 45, the arithmetic control module 29 performs a linear scan with, for instance, a tip of the narrow-diameter portion 5*a* as a start point. The tip of the narrow-diameter portion 5*a* is determined as the start point because the measuring point 11 does not obviously exist between the tip of the narrow-diameter portion 5*a* and the center of the target 47. Since the distance from the tip of the narrow-diameter portion 5*a* to the center of the target 47 is known, the linear scan from the center of the target 47 to the tip of the narrow-diameter portion 5*a* can be omitted.

It is to be noted that, even if the distance from the tip of the narrow-diameter portion 5*a* to the center of the target 47 is known, needless to say, an arbitrary point on the axis 44 (on the direction vector 45) may be determined as the start point.

The processing other than a position of the start point in (Step 16), the comparison between a calculation result of the intersection 46 and a measurement result of the surveying instrument 2 in (Step 17), and the measurement of the measuring point 11 in (Step 18) are the same as the processing in (Step 06) to (Step 08) in the first embodiment, and hence a description thereof will be omitted.

(Step 19) By completing the measurement of the measuring point 11, the arithmetic control module 29 drives the optical axis deflector 32, the search scan is again performed with the center of the target 47 as a center, and the tracking is carried out. In case of continuing the measurement, when a desired measuring point 11 is irradiated with the laser pointer light 7 and the trigger switch 8 is pressed, the processing of (Step 15) to (Step 19) are again executed.

As described above, in the second embodiment, the target 47 is configured to provide at a known position on the pole 5, and the target 47 can be tracked by the surveying instrument 2. Therefore, the surveying instrument 2 can track the trigger device 3 in all directions, and the workability can be improved.

Further, the target 47 provided at a known position on the pole 5 is configured to be detected, and the tip of the narrow-diameter portion 5*a* can be set as a start point of the linear scan. Therefore, a scan range and the number of data to be acquired can be reduced, and a scan time can be decreased.

Figure 8:
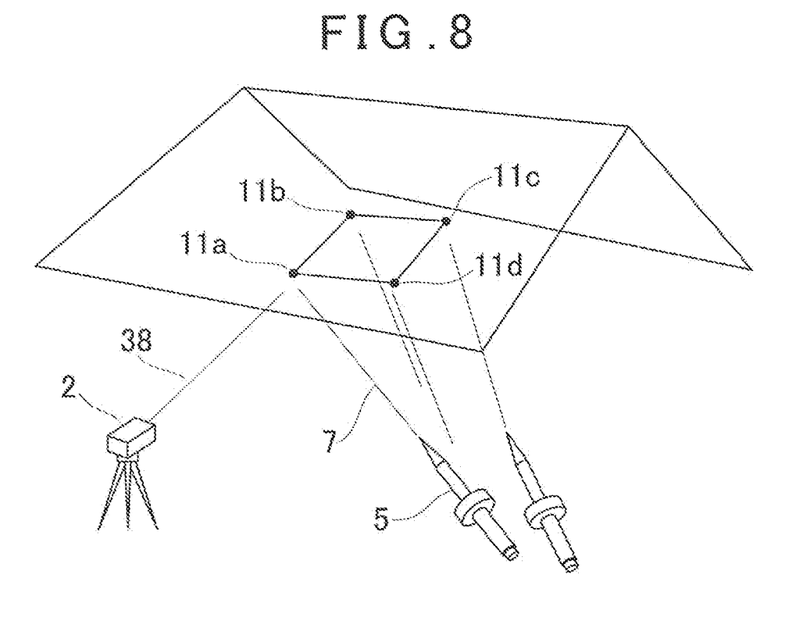
FIG. 8 is an explanatory drawing showing an example of an application example of the surveying system according to an embodiment of the present invention.

It is to be noted that, in the first embodiment and the second embodiment, the description has been given on the case where the one measuring point 11 is measured by using the surveying system 1. On the other hand, two desired points 11*a* and 11*b* such as the corners of a room may be measured, and a distance between the two points 11*a* and 11*b*, a tilt of a straight line connecting the two points 11*a* and 11*b* and the like may be calculated. Further, three or more desired points, for instance, four desired points 11*a* to 11*d* may be measured as shown in FIG. 8, and an area or a tilt of a plane formed of the lines connecting the four points 11*a* to 11*d* may be calculated.

When the surveying system 1 is used, even if a view is continuous and the points are hard to be designated from a camera image due to, for instance, a short distance between the respective points, the respective points can be easily designated from the vicinity of an object.

Further, in the first embodiment and the second embodiment, the linear scan is finished when a measurement result of the surveying instrument 2 coincides with a calculation result of the intersection 46. On the other hand, the whole deflection range of the optical axis deflector 32 may be linearly scanned irrespective of whether the measuring point 11 is detected.

Figure 9:
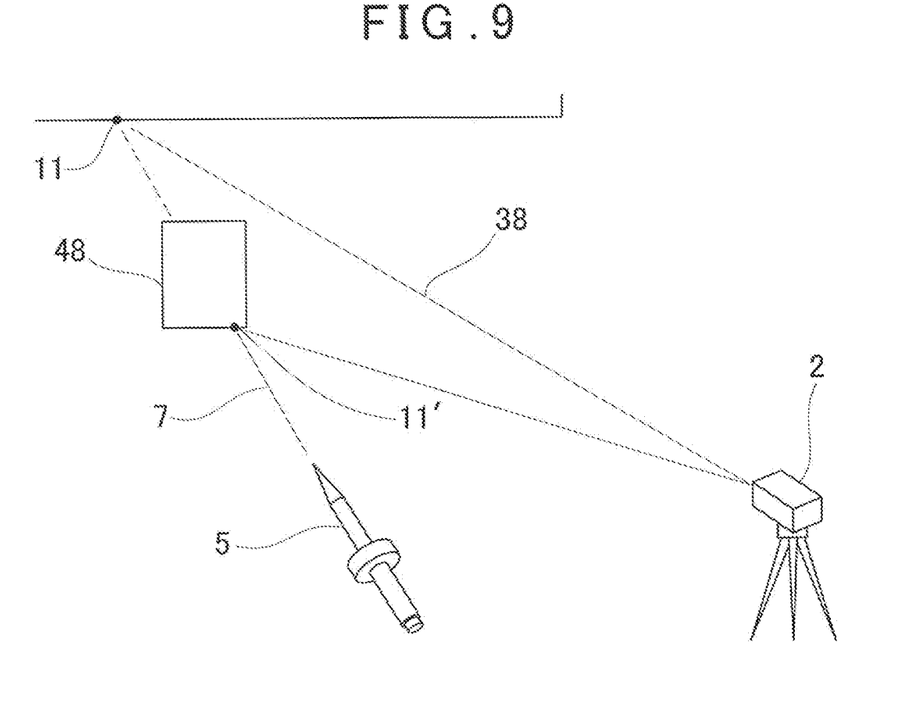
FIG. 9 is an explanatory drawing showing an example of an application example of the surveying system according to an embodiment of the present invention.

For instance, as shown in FIG. 9, in a case where an obstacle 48 is present between the trigger device 3 and the object 9, there are two measuring points 11 at which a measurement result of the surveying instrument 2 coincides with a calculation result of the intersection 46.

In a case where a first point at which the measurement result of the surveying instrument 2 coincides with the calculation result of the intersection 46 is determined as the measuring point 11, a measuring point 11' which is not present on the object 9 is erroneously detected. On the other hand, in a case where above-described configuration is adopted, since the measuring point 11' can be eliminated by the post-processing and the measuring point 11 on the object 9 can be selected, the measurement accuracy can be improved.

It is to be noted that, in the first embodiment and the second embodiment, the laser pointer is provided to the trigger device 3 and a point irradiated with the laser pointer light 7 is determined as the measuring point 11, but the laser pointer may be omitted.

In this case, since the visual confirmation using the laser pointer light 7 cannot be performed, a position of the measuring point 11 is rough. For this reason, a point at which a measurement result of the surveying instrument 2 coincides with a calculation result of the intersection 46 is first detected as the measuring point 11. Then, the surveying instrument 2 two-dimensionally scans an entire predetermined range with the measuring point 11 as a center by the distance measuring light 38.

Figure 10:
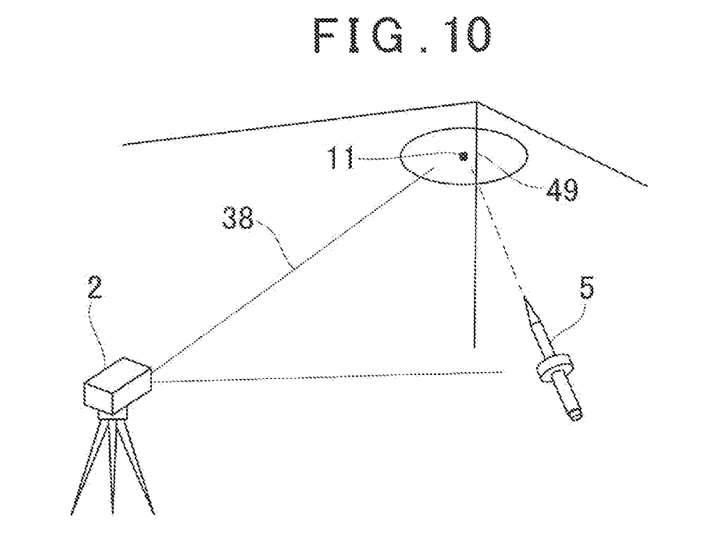
FIG. 10 is an explanatory drawing showing an example of an application example of the surveying system according to an embodiment of the present invention.

The surveying system 1 having the above-described configuration can be used for the detection of a corner portion or a ridge line of a room, the measurement of a height or a width of a room and the like. For instance, in case of detecting a ridge line 49 of a room, as shown in FIG. 10, the tip of the pole 5 is directed toward a rough ridge line direction, and the trigger switch 8 is pressed. Thereby, a predetermined range with the measuring point 11 near the ridge line 49 as a center is scanned, and the ridge line 49 can be detected based on a change in measurement value in the predetermined range.

Figure 11:
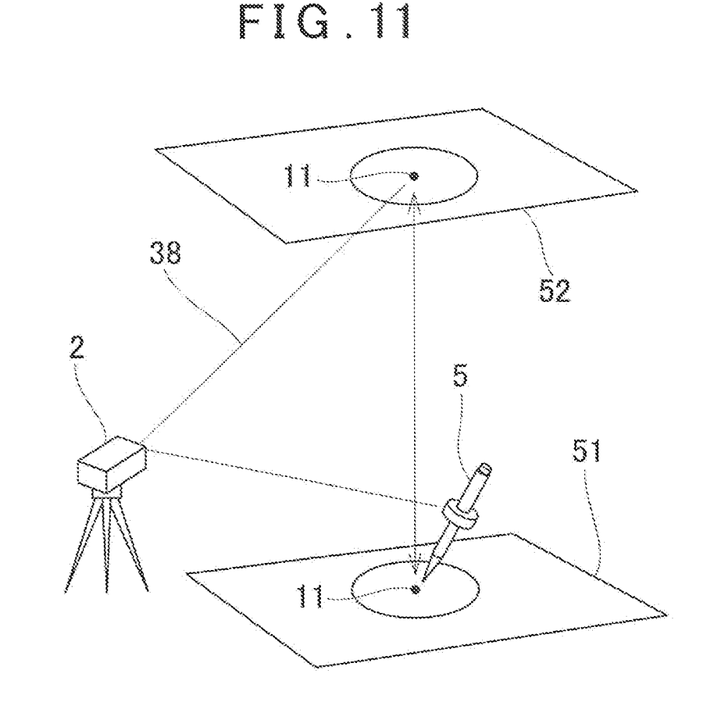
FIG. 11 is an explanatory drawing showing an example of an application example of the surveying system according to an embodiment of the present invention.

Further, in case of detecting a height of a room, the trigger device 3 is directed to a predetermined position on a floor 51, the measurement is performed, the trigger device 3 is further directed toward a predetermined position on a ceiling 52 which is substantially vertical with respect to the predetermined position on the floor 51, and the measurement is performed. Thereby, in regard to each of the floor 51 and the ceiling 52, since a predetermined range having the measuring point 11 as a center is scanned, the distances between the respective points in a scan range on the floor 51 and the respective point in a scan range of the ceiling 52 are calculated, and a minimum distance can be calculated as the height of the room.

It is to be noted that, as to the surveying system 1 configured to two-dimensionally scan a predetermined range with the measuring point 11 as a center, needless to say, the trigger device 3 may include the laser pointer.

In the first embodiment and the second embodiment, the trigger communication module 6 and the trigger switch 8 are provided to the trigger device 3, and the measurement is performed based on a measurement start signal which is transmitted from the trigger communication module 6 by pressing the trigger switch 8. On the other hand, the trigger device 3 does not have to include the trigger communication module 6 and the trigger switch 8.

For instance, a camera is provided to the surveying instrument 2, and a light source is provided to the trigger device 3. In case of this configuration, the detection of the light source by the camera can be determined as a trigger, and the measurement can be started.

Alternatively, the standstill conditions, for instance, a position, a direction vector 45, and a standstill duration time are set, the target 47 (or the pole 5) is captured and tracked by the closed loop search scan 43. In this state, a position of the target 47 (a position of an arbitrary point on the axis 44 of the pole 5) and the direction vector 45 may be continuously measured, meeting the standstill conditions may be determined as a trigger, and the measurement (the linear scan) may be started.

Further, in the first embodiment and the second embodiment, one laser pointer (not shown) is provided with respect to the pole 5, and the laser pointer light 7 is projected from the tip of the pole 5. On the other hand, the two or more laser pointers may be provided with respect to the pole 5, and the laser pointer lights 7 may be projected from the positions other than the tip of pole 5.

Figure 12A:
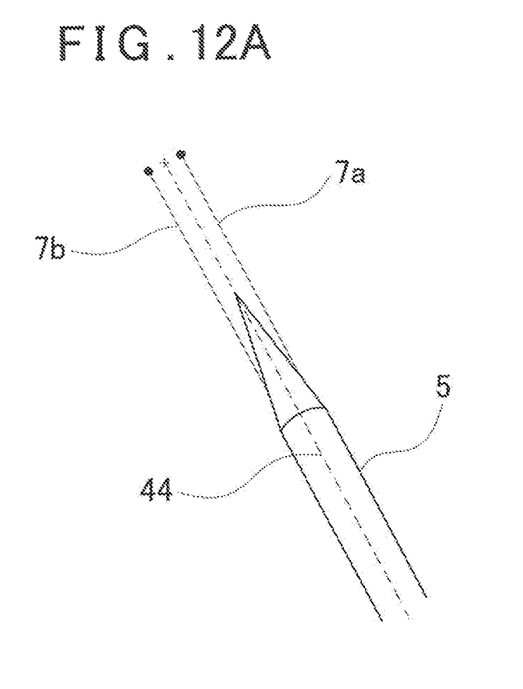
FIG. 12A, FIG. 12B, FIG. 12C and FIG. 12D are the explanatory drawings each showing a case where a plurality of laser pointers are provided on a pole.
Figure 12B:
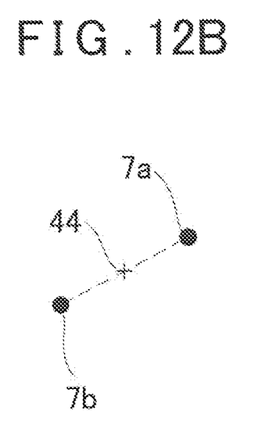
Figure 12C:
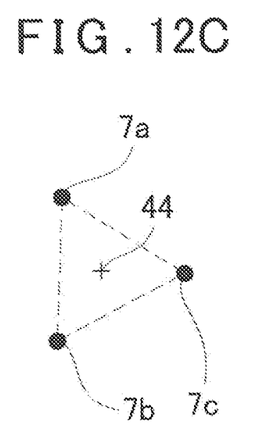
Figure 12D:
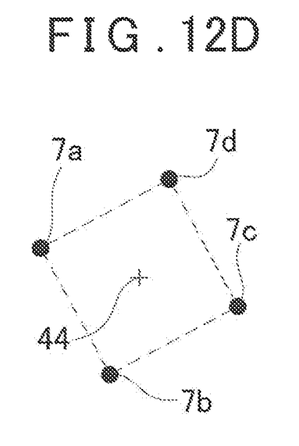

For instance, as shown in FIG. 12A and FIG. 12B, in case of providing the two laser pointers, the respective laser pointers are arranged in such a manner that two laser pointer lights 7a and 7b become parallel with respect to the axis 44 and the axis 44 is placed at the center of a straight line connecting the respective laser pointer lights 7a and 7b. Further, in case of providing three or more laser pointers, the respective laser pointers are arranged in such a manner that the three or more laser pointer lights 7a, 7b, 7c, . . . become parallel to the axis 44 and the axis 44 is placed at the center of a graphic form formed by connecting the respective laser pointer lights 7a, 7b, 7c, . . . .

That is, in case of providing a plurality of laser pointers, the respective laser pointers are arranged in such a manner that the axis 44 and the respective laser pointer lights 7 become parallel to each other and the distances between the axis 44 and the laser pointer lights 7 all become equal.

The invention claimed is:

1. A surveying system comprising:
a surveying instrument and a trigger device, wherein said trigger device includes a pole having a reflective peripheral surface and is configured to irradiate a laser pointer light along a longitudinal axis of the pole,
said surveying instrument includes a distance measuring unit for projecting a distance measuring light, receiving the reflected distance measuring light from said pole and performing the distance measurement,
an optical axis deflector which is provided on an optical axis of said distance measuring light and configured to enable two-dimensional deflecting said distance measuring light and said optical axis,
a projecting direction detecting module for detecting a deflection angle of said optical axis of said distance measuring light and performing a deflection angle measurement, and
an arithmetic control module for controlling said distance measuring unit and said optical axis deflector, wherein said arithmetic control module performs a search scan using said distance measuring light in a scan pattern having a predetermined shape, captures said pole,
acquires point cloud data of at least two positions where said scan pattern crosses said pole,
calculates an axis of said pole based on said point cloud data, calculates a direction vector based on said axis of said pole,
performs a linear scan using said distance measuring light along said direction vector,
calculates three-dimensional coordinates of an intersection between the optical axis of said distance measuring light and said direction vector,
acquires three-dimensional coordinates based on a distance measurement result of said distance measuring unit and an angle measurement result of said projecting direction detecting module, referred to as a measurement result,
determines a point at which the three-dimensional coordinates of said intersection coincide with the three-dimensional coordinates of said measurement result or at which a distance between said intersection and said measurement result becomes a minimum as a measuring point,
and calculates the three-dimensional coordinates of said measuring point.

2. The surveying system according to claim 1, wherein said trigger device communicates with said surveying instrument and includes a trigger switch configured to transmit a measurement start signal with respect to said surveying instrument.

3. The surveying system according to claim 2, wherein said pole is constituted of a narrow-diameter portion and a thick-diameter portion having the different diameters, and said arithmetic control module is configured to calculate a direction of said direction vector based on said point cloud data and determines a direction of said linear scan.

4. The surveying system according to claim 3, wherein said trigger device further includes a target provided on a boundary portion between said narrow-diameter portion and said thick-diameter portion of said pole, and said target has a diameter larger than the diameters of said narrow-diameter portion and said thick-diameter portion, a center of said target is placed on said axis at a known distance from a tip of said narrow-diameter portion, and a peripheral surface of said target is a reflective surface.

5. The surveying system according to claim 1, wherein said trigger device further includes at least one laser pointer, and said laser pointer is arranged in such a manner that one laser pointer light is projected onto said axis of said pole or a plurality of laser pointer lights are projected to the positions which are parallel to and away from said axis at an equal distance.

6. The surveying system according to claim 5, wherein said pole is constituted of a narrow-diameter portion and a thick-diameter portion having the different diameters, and said arithmetic control module is configured to calculate a direction of said direction vector based on said point cloud data and determines a direction of said linear scan.

7. The surveying system according to claim 6, wherein said trigger device further includes a target provided on a boundary portion between said narrow-diameter portion and said thick-diameter portion of said pole, and said target has a diameter larger than the diameters of said narrow-diameter portion and said thick-diameter portion, a center of said target is placed on said axis at a known distance from a tip of said narrow-diameter portion, and a peripheral surface of said target is a reflective surface.

8. The surveying system according to claim 1, wherein said pole is constituted of a narrow-diameter portion and a thick-diameter portion having the different diameters, and said arithmetic control module is configured to calculate a direction of said direction vector based on said point cloud data and determines a direction of said linear scan.

9. The surveying system according to claim 8, wherein said trigger device further includes a target provided on a boundary portion between said narrow-diameter portion and said thick-diameter portion of said pole, and said target has a diameter larger than the diameters of said narrow-diameter portion and said thick-diameter portion, a center of said target is placed on said axis at a known distance from a tip of said narrow-diameter portion, and a peripheral surface of said target is a reflective surface.

10. The surveying system according to claim 9, wherein said arithmetic control module is configured to control said optical axis deflector in such a manner that a center of said scan pattern substantially coincides with said center of said target.

11. The surveying system according to claim 9, wherein said linear scan is configured to start from said tip of said pole on said direction vector.

12. The surveying system according to claim 9, wherein said linear scan is configured to start at an arbitrary point on said direction vector.

13. The surveying system according to claim 8, wherein said linear scan is configured to start at an arbitrary point on said direction vector.

14. The surveying system according to claim 1, wherein said arithmetic control module is configured to capture again said pole in said scan pattern after calculating the three-dimensional coordinates of said measuring point.

15. The surveying system according to claim 1, wherein said arithmetic control module is configured to increase the point cloud density between two points at each of which a distance between said intersection and said measurement result becomes a preset threshold value or less, and perform again said linear scan.

16. The surveying system according to claim 1, wherein said linear scan is configured to start at an arbitrary point on said direction vector.

17. The surveying system according to claim 1, wherein said arithmetic control module is configured to scan a whole predetermined range having said measuring point as a center with the use of said distance measuring light after calculating the three-dimensional coordinates of said measuring point.

18. The surveying system according to claim 1, wherein said scan pattern is a scan pattern which draws a locus with a shape of numeral 8.

* * * * *